UNITED STATES PATENT OFFICE.

GILBERT THOMAS MORGAN, OF LONDON, ENGLAND, ASSIGNOR TO IMPERIAL TRUST FOR THE ENCOURAGEMENT OF SCIENTIFIC AND INDUSTRIAL RESEARCH, OF WESTMINSTER, LONDON, ENGLAND.

MANUFACTURE OF AROMATIC ARYLSULPHONYL AND ARYLENE-DISULPHONYL DERIVATIVES OF 1:4 NAPHTHYLENEDIAMINE AND ITS SULPHONIC ACIDS.

No Drawing. Application filed June 29, 1920. Serial No. 392,737.

*To all whom it may concern:*

Be it known that I, GILBERT THOMAS MORGAN, D. Sc., F. R. S., a subject of the King of Great Britain and Ireland, and residing at City and Guilds Technical College, Leonard Street, Finsbury, London, E. C. 3, England, have invented certain new and useful improvements in and relating to the manufacture of aromatic arylsulphonyl and arylene-disulphonyl derivatives of 1:4 naphthylenediamine and its sulphonic acids, of which the following is a specification.

This invention relates to the manufacture of arylsulphonyl-1:4-naphthylenediamines $Ar'.SO_2.NH.C_{10}H_6.NH_2$, and arylenedisulphonyl-bis-1:4-naphthylenediamines $Ar''(SO_2.NH.C_{10}H_6.NH_2)_2$ and the sulphonic acids of these compounds.

Of these groups of compounds, only one, namely benzenesulphonyl-1:4-naphthylenediamine, has hitherto been described, having been formerly prepared by roundabout methods not suitable for employment under industrial conditions (Morgan and Micklethwait, Chem. Soc. Trans. 1905. 87. 929).

The invention is based upon the observation that all the members of the groups of bodies mentioned may be prepared by a general process.

The process of producing such bodies according to the invention comprises reducing the para azo or para nitro derivatives of the aryl sulphonyl α naphthylamines or arylene disulphonyl bis α naphthylamines or their sulphonic acids containing the sulphonic radical in the positions 2, 6, 7 or 8 with respect to the arylsulphonylamino or arylene disulphonylamino radical by the employment of a reducing medium which is neither so strongly acid nor so strongly alkaline that hydrolytic change and elimination of arylsulphonyl or arylene disulphonyl groups takes place during the operation.

The invention more particularly consists in the process of producing arylsulphonyl 1:4-naphthylene-diamines - $Ar'.SO_2.NH.C_{10}H_6.NH_2$, arylene disulphonyl-bis-1:4-naphthylene diamines $Ar''(SO_2.NH.C_{10}H_6.NH_2)_2$ and the sulphonic acids of these compounds which comprises forming para azo derivatives by causing aryl sulphonyl α naphthylamines or arylene disulphonyl bis α naphthylamines or their sulphonic acids containing the sulphonic radical in the positions 2, 6, 7 or 8, with respect to the aryl sulphonylamino or arylene disulphonyl amino radical to react with diazonium compounds as, for instance, benzene diazonium chloride, ortho and para toluene diazonium chlorides, α and β naphthalenediazonium chlorides and the like in alkaline media, and effecting the reduction of the para-azo derivatives thus produced in the manner specified above.

The invention also consists in condensing α naphthylamine or α naphthylamine sulphonic acids containing the following groups in the relative positions indicated:— $NH_2=1$; $SO_3H=2, 6, 7$ or 8 with arylenedisulphonic acid chlorides $Ar''(SO_2Cl)_2$ derived, for instance, from benzene, toluene or their homologues or from naphthalene, causing the arylenedisulphonyl bis α naphthylamine or the sulphonic acids thereof thereby formed to react with diazonium compounds and reducing the para azo derivatives thus produced in the manner specified above.

The condensation of the α naphthylamine or α naphthylamine sulphonic acids with an arylene disulphonic chloride may conveniently be effected by mixing α naphthylamine or the alkali salt of one of its sulphonic acids as specified above, with an arylene disulphonic chloride in the presence of pyridine, anhydrous sodium acetate or some other reagent capable of fixing the hydrogen chloride set free during reaction.

The reduction of the para azo derivatives may be completely effected without hydrolysis or elimination of the arylsulphonyl or arylenedisulphonyl groups giving rise to arylsulphonyl and arylenedisulphonyl derivatives of 1:4 naphthylenediamine or its sulphonic acids containing the sulphonic radical in positions 2, 6, 7 or 8 with respect to the arylsulphonylamino-radical. This reduction can be carried out with commercially available reagents such as zinc dust and aqueous caustic soda, zinc dust and ammonium chloride, iron borings and dilute acids, alkaline sodium hydrosulphite, alkaline sodium sulphide, stannous chloride or titanous chloride, providing that the medium in which the reduction is effected is neither so strongly acid nor so strongly alkaline that hydrolytic change and elimination of arylsulphonyl or arylenedisulphonyl groups takes place during this operation.

The reactions taking place in the reduction of the para-azo derivatives of arylsulphonyl-α-naphthylamines and arylenedisulphonyl-bis-α-naphthylamines may be represented by the following graphic formulæ.

1. *Production of an arylsulphonyl-1:4-naphthylenediamine.—*

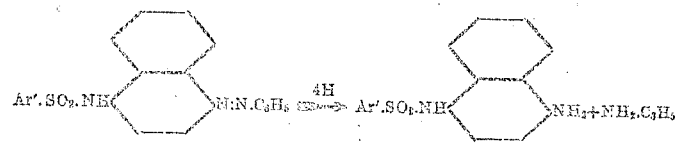

2. *Production of an arylenedisulphonyl-bis-1:4-naphthylenediamine.—*

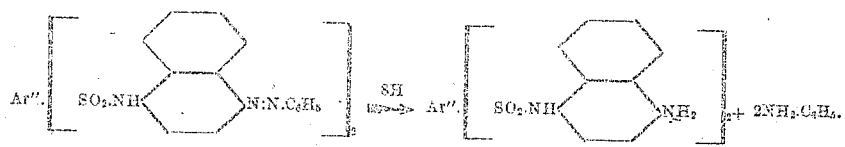

In the case of the arylsulphonyl and arylenedisulphonyl derivatives containing sulphonic radicals, the reduction takes a similar course.

For the purpose of illustration, certain examples of suitable ways in which the invention may be carried into effect are given below, in which examples the proportions of materials used are stated in parts by weight.

*Example 1.—Toluene-p-sulphonyl-1:4-naphthylenediamine.—*

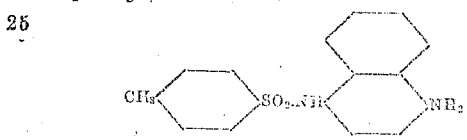

Ten parts of α-naphthylamine, 15 parts of toluene-p-sulphonic chloride and 11.5 parts of anhydrous sodium acetate are ground together until the pasty mass becomes solid. The toluene-p-sulphonyl-α-naphthylamine is washed with aqueous sodium carbonate to remove unaltered toluene-p-sulphonic chloride and six parts are dissolved in 13 parts of 5 normal sodium hydroxide and 30 parts of water and treated in the cold with benzene-diazonium chloride obtained from 1.9 parts of aniline. The sodium salt of benzene-4-azo-toluene-p-sulphonyl-α-naphthylamine separates as a sparingly soluble viscid mass soluble in alcohol from which solution dilute acetic acid precipitates the free azo-compound melting at 203° C. (Witt gives 201° Berichte. 1894. 27 2372).

Eight parts of benzene-4-azo-p-toluenesulphonyl-α-naphthylamine is dissolved in 30 parts of alcohol and 30 parts of water containing 0.8 parts of ammonium chloride in a vessel fitted with an efficient stirrer. To the boiling solution 8 parts of zinc dust are slowly added, the heating continued until the solution is decolourized when the liquid is filtered into a slight excess of dilute acetic acid.

The toluene-p-sulphonyl-1:4-naphthylenediamine is thus obtained as a pinkish white precipitate which when crystallized melts at 187–188°.

*Example 2.—*Four parts of the azo-compound of the preceding example are dissolved in 1000 parts of water containing 25 parts of 5 normal sodium hydroxide. The solution is heated to 50–60° and 20 parts of 20% solution of sodium hydrosulphite are slowly added with continual stirring until the solution is decolourized. The filtered solution is then acidified with dilute acetic or hydrochloric acid and the product is isolated as in example 1.

*Example 3.—Benzene-1:3-disulphonyl-bis-1:4-naphthylamine.—*

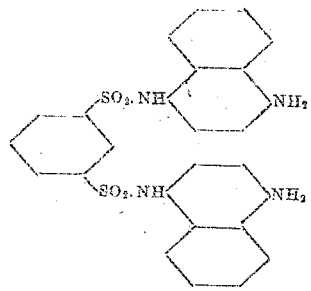

Three parts of α-naphthylamine, 3-2 parts of benzene-1:3-disulphonic chloride and 2 parts of anhydrous sodium acetate are ground together and the pasty mass is warmed with excess of aqueous sodium carbonate, the insoluble benzene-1:3-disulphonyl-bis-α-naphthylamine collected, washed and dried.

Four parts of this intermediate condensation product are dissolved in five parts of 5 normal sodium hydroxide and 100 parts of water, cooled with ice and treated with the diazonium chloride prepared in the well-known way from 1.5 parts of aniline. During coupling the solution is kept alkaline and after stirring for about 2 hours the liquid is acidified with dilute mineral acid or acetic acid. The azo-compound separates in ochre yellow masses.

Four parts of the azo-compound are dissolved in 10 parts of 5 normal sodium hydroxide and 200 parts of water, the solution heated to 100° and 4 parts of zinc dust slowly added and the heating continued until the solution is decolourized. After filtering from the zinc dust and oxide the solution is acidified and the benzene-1:3-disulphonyl-bis-1:4-naphthylene-diamine is isolated in the manner described in the preceding examples.

*Example 4.—Naphthalene-2:6-disulphonyl-bis-1:4-naphthylenediamine.—*

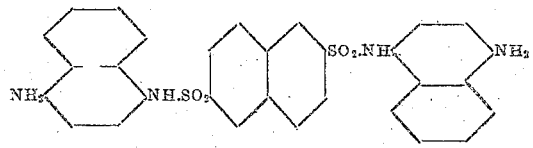

Two parts of α-naphthylamine, 2.5 parts of naphthalene-2:6-disulphonic chloride (m.p.226°) and three parts of anhydrous sodium acetate are mixed together, slightly warmed and the mixture treated with aqueous sodium carbonate and the product isolated as in Example 3. Five parts of naphthalene-2:6-disulphonyl-bis-α-naphthylamine dissolved in 20 parts of 5 normal sodium hydroxide and 200 parts of water are treated with benzenediazonium chloride derived from 1.8 parts of aniline. The solution is maintained alkaline throughout the coupling and the dark brownish red azo-compound, $C_{10}H_6(SO_2.NH.C_{10}H_6—N:N—C_6H_5)_2$ is precipitated by the addition of dilute acid.

Seven parts of this azo-compound are dissolved in 40 parts of 5 normal sodium hydroxide and 200 parts of water and reduced at 100° with 12 parts of zinc dust. The decolourized solution is filtered and acidified when the naphthalene-2:6-disulphonyl-bis-1:4-naphthylenediamine is precipitated.

*Example 5.—1-toluene-p-sulphonyl-1:4-naphthylenediamine-8-sulphonic acid.—*

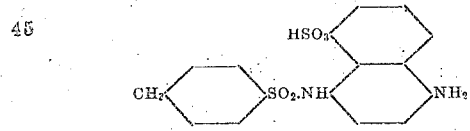

Five parts of α-naphthylamine-8-sulphonic acid, 4.3 parts of toluene-p-sulphonic chloride, 3 parts of anhydrous sodium acetate and one part of pyridine are warmed together and the pasty mass is dissolved in warm aqueous sodium carbonate. The cold filtered solution is treated with benzenediazonium chloride from 1:8 parts of aniline. The solution of azo-compound is reduced with 20 parts of zinc dust and 45 parts of 5 normal sodium hydroxide and the cold decolourized filtrate treated with dilute acetic acid when the product is obtained as a yellowish white precipitate becoming light purple on exposure to light and air.

The other sulphonic acids of the arylsulphonyl-α-naphthylamines are produced in a similar manner by replacing the α-naphthylamine-8-sulphonic acid in this example by α-naphthylamine-7-sulphonic acid or α-naphthylamine-6-sulphonic acid or α-naphthylamine-2-sulphonic acid.

*Example 6.—1-benzene-3-disulphonyl-bis-1:4-naphthylenediamine-8-sulphonic acid.—*

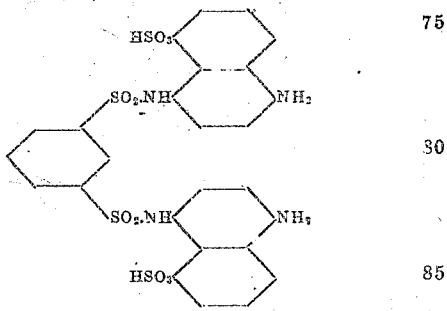

Four parts of α-naphthylamine-8-sulphonic acid (Scholkopf acid), 3·2 parts of benzene-1:3-disulphonic chloride and 2 parts of sodium acetate are ground together and the mass moistened with one part of pyridine warmed gently till the mixture is complete. Acetic acid is evolved and the pasty mass stiffens. Any unchanged benzene-1:3-disulphonic chloride is decomposed with sodium carbonate and the intermediate product is obtained partly undissolved and the remainder isolated on concentrating the solution.

Four parts of the bis-disulphonyl compound are dissolved in 12 parts of 5 normal sodium hydroxide and 200 parts of water and coupled in alkaline solution with the diazonium salt from one part of aniline. The resulting azo-derivative is precipitated with acetic acid or its sodium salt may be separated by salting out.

The orange red azo-compound or its sodium salt is reduced as in Example 5 with zinc dust and aqueous sodium hydroxide. 1-benzene-1':3-disulphonyl-bis-1:4-naphthylenediamine-8-sulphonic acid is isolated in a similar manner to that indicated in the preceding example.

The aryl sulphonyl 1-4-naphthylenediamines and the arylene disulphonyl-bis-1:4-naphthylenediamines and their sulphonic acids having the sulphonic radical in the position 2, 6, 7, or 8 with respect to the arysulphonylamino or arylenedisulphonylamino radical and which have the chemical constitutions represented by the following general formulæ:—

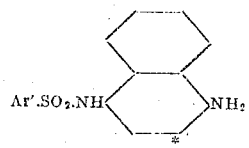
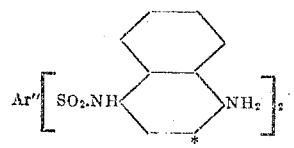

1. (aryl derivatives), 2. (arylene derivatives), are characterized by the presence of a very reactive hydrogen atom in the positions marked by an asterisk (*) in the general formulæ and are accordingly of considerable utility in the production of ortho-azo dyes and of colour producing intermediates.

Claims:

1. The process of producing derivatives of 1:4 naphthylene diamines having a hydrogen of an amino group attached to a naphthalene nucleus replaced by an aromatic sulphonyl group, which comprises reducing by the employment of a weak reducing medium a para-azo derivative of an α naphthylamine derivative having a hydrogen of an amino group attached to a naphthalene nucleus replaced by an aromatic sulphonyl group.

2. The process of producing derivatives of 1:4 naphthylene diamines having a hydrogen of an amino group attached to a naphthalene nucleus replaced by an aromatic sulphonyl group, which comprises reducing, by the employment of a reducing medium which is neither so strongly acid nor so strongly alkaline that hydrolytic change and elimination of the aromatic sulphonyl group takes place during the operation, a para-azo derivative of an α naphthylamine derivative having a hydrogen of an amino group attached to a naphthalene nucleus replaced by an aromatic sulphonyl group.

3. The process of producing derivatives of 1:4 naphthylene diamines containing two α naphthylamine groups and having a hydrogen of an amino group of each of the naphthylamine groups replaced by a sulphonyl group, which comprises reducing, by the employment of a weak reducing medium, a para-azo derivative an α naphthylamine derivative containing two α naphthylamine groups, a hydrogen of an amino group of each of which groups is replaced by a sulphonyl group connected to an arylene group common to the sulphonyl groups.

4. The process of producing derivatives of 1:4 naphthylene diamines containing two α naphthylamine groups and having a hydrogen of an amino group of each of the naphthylamine groups replaced by a sulphonyl group which comprises reducing, by the employment of a reducing medium which is neither so strongly acid nor so strongly alkaline that hydrolytic change and elimination of the aromatic sulphonyl group takes place during the operation, a para-azo derivative of an α naphthylamine derivative containing two α naphthylamine groups, a hydrogen of an amino group of each of which groups is replaced by a sulphonyl group connected to an arylene group common to the sulphonyl groups.

In testimony whereof I have signed my name to this specification.

GILBERT THOMAS MORGAN.